(12) United States Patent
Robinson et al.

(10) Patent No.: US 8,787,633 B2
(45) Date of Patent: Jul. 22, 2014

(54) SYSTEM AND METHOD OF ORGANISM IDENTIFICATION

(75) Inventors: J. Paul Robinson, West Lafayette, IN (US); Bartlomiej Rajwa, West Lafayette, IN (US); Bulent Bayraktar, West Lafayette, IN (US); Arun K. Bhunia, West Lafayette, IN (US); E. Daniel Hirleman, West Lafayette, IN (US); Euiwon Bae, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 1506 days.

(21) Appl. No.: 12/008,476

(22) Filed: Jan. 11, 2008

(65) Prior Publication Data

US 2008/0310692 A1      Dec. 18, 2008

Related U.S. Application Data

(60) Provisional application No. 60/880,576, filed on Jan. 16, 2007.

(51) Int. Cl.
*G06K 9/00* (2006.01)

(52) U.S. Cl.
USPC .......................................... 382/128; 382/100

(58) Field of Classification Search
None
See application file for complete search history.

(56) References Cited

U.S. PATENT DOCUMENTS

| | | | |
|---|---|---|---|
| 3,892,632 A | | 7/1975 | Campbell et al. |
| 3,962,040 A | * | 6/1976 | Campbell et al. .......... 435/287.3 |
| 4,661,913 A | * | 4/1987 | Wu et al. ........................ 702/19 |
| 5,112,745 A | | 5/1992 | Lorr |
| 5,739,003 A | * | 4/1998 | Brocklehurst et al. .......... 435/29 |
| 5,863,754 A | | 1/1999 | Bajard |
| 6,060,710 A | * | 5/2000 | Carrieri et al. ............. 250/338.1 |
| 6,095,982 A | * | 8/2000 | Richards-Kortum et al. 600/476 |
| 6,340,570 B1 | | 1/2002 | Anderson et al. |
| 6,556,299 B1 | * | 4/2003 | Rushbrooke et al. ......... 356/417 |
| 6,713,019 B2 | | 3/2004 | Ozasa et al. |

(Continued)

FOREIGN PATENT DOCUMENTS

| | | |
|---|---|---|
| WO | WO 98/59314 A1 | 12/1998 |
| WO | WO 01/83673 A2 | 11/2001 |
| WO | WO 02/21108 A2 | 3/2002 |
| WO | WO 02/21108 A3 | 3/2002 |

OTHER PUBLICATIONS

Bayraktar et al. ("Feature extraction from light-scatter patterns of *Listeria* colonies for identification and classification", Journal of Biomedical Optics, vol. 11(3), 034006-1 to 034006-8, (May/Jun. 2006)), as applied to claim 38 above, and further in view of Gould et al. (US 20050060295 A1.*

(Continued)

*Primary Examiner* — Andrew Smyth
(74) *Attorney, Agent, or Firm* — Brinks Gilson and Lione

(57) ABSTRACT

A system and method for identifying organisms by analysis of scattergrams of colonies is disclosed. cattergrams are obtained by culturing samples and illuminating the resultant colonies by a laser. The forward scattered light is imaged and subject to a feature extraction process. The feature vector may include Zernike or Chebyshev moments and may also include Harelick texture features. Feature vectors may be used to train a classification process using either supervised or unsupervised machine learning techniques. The classification process may be used to associate a colony phenotype with the genotype of the sample.

42 Claims, 12 Drawing Sheets

(56) References Cited

U.S. PATENT DOCUMENTS

| | | | |
|---|---|---|---|
| 6,831,735 B2* | 12/2004 | Tsukada | 356/73 |
| 6,911,312 B2 | 6/2005 | Anderson et al. | |
| 6,919,960 B2 | 7/2005 | Hansen et al. | |
| 6,981,146 B1* | 12/2005 | Sheymov | 713/172 |
| 7,738,709 B2* | 6/2010 | Shi et al. | 382/224 |
| 2002/0149763 A1* | 10/2002 | Tsukada | 356/73 |
| 2002/0161731 A1* | 10/2002 | Tayebnejad et al. | 706/20 |
| 2002/0183965 A1* | 12/2002 | Gogolak | 702/179 |
| 2004/0052414 A1* | 3/2004 | Schroder | 382/167 |
| 2004/0199388 A1* | 10/2004 | Armbruster et al. | 704/251 |
| 2004/0219627 A1* | 11/2004 | Kawashima | 435/29 |
| 2005/0060295 A1* | 3/2005 | Gould et al. | 707/3 |
| 2005/0152603 A1* | 7/2005 | Bober | 382/190 |
| 2006/0140455 A1* | 6/2006 | Costache et al. | 382/118 |
| 2006/0172370 A1* | 8/2006 | Hirleman et al. | 435/34 |
| 2006/0200436 A1* | 9/2006 | Zhou et al. | 706/13 |
| 2006/0204071 A1* | 9/2006 | Ortyn et al. | 382/133 |
| 2006/0223137 A1* | 10/2006 | Yoshida et al. | 435/34 |
| 2007/0014435 A1* | 1/2007 | Mirowski et al. | 382/109 |
| 2007/0042332 A1* | 2/2007 | Leem | 434/156 |
| 2007/0106582 A1* | 5/2007 | Baker et al. | 705/35 |
| 2007/0258618 A1* | 11/2007 | Shi et al. | 382/100 |
| 2007/0265816 A1* | 11/2007 | Elmer et al. | 703/11 |
| 2007/0270978 A1* | 11/2007 | Shi et al. | 700/1 |
| 2008/0013821 A1* | 1/2008 | Macgregor et al. | 382/141 |

OTHER PUBLICATIONS

Bayraktar et al. ("Feature extraction from light-scatter patterns of *Listeria* colonies for identification and classification", Journal of Biomedical Optics, vol. 11(3), 034006-1 to 034006-8, (May/Jun. 2006)).*

Bhunia, A.K. (1997) Antibodies to *Listeria monocytogenes*. *Critical Reviews in Microbiology*. 23: 77-107.

Bhunia, A.K., and Lathrop, A. (2003) Pathogen detection, foodborne. In *McGraw-Hill yearbook of Science and Technology*. New York: McGraw-Hill, pp. 320-323.

Bille, J., Catimel, Bannerman, E., Jacquet, C., Yersin, M.N., Caniaux, I., Monget, D., and Rocourt, J. (1992) API *Listeria*, a new and promising one-day system to identify *Listeria* isolates. *Applied and Environmental Microbiology* 58: 1857-1860.

Bohren, C.F., and Singham, S.B. (1991) Backscattering by nonspherical particles: A review of methods and suggested new approaches. *Journal of Geophysical Research* 96: 52695277.

Dong, Z., Zelmer, C.D., Canny, M.J., McCully, M.E., Luit, B., Pan, B., Faustino, R.S., Pierce, G.N., and Vessey, J.K. (2002) Evidence for protection of nitrogenase from 02 by colony structure in the aerobic diazotroph *Gluconacetobacter diazotrophicus*. *Microbiology* 148: 2293-2298.

Bronk, B., Druger, S., Czege, J., and Van de Merwe, W. (1995) Measuring diameters of rod-shaped bacteria in vivo with polarized light scattering. *Biophys. J.* 69: 1170-1177.

Buchrieser, C., Rusniok, C., Kunst, F., Cossart, P., and Glaser, P. (2003) Comparison of the genome sequences of *Listeria monocytogenes* and *Listeria innocua*: clues for evolution and pathogenicity. *Fems Immunology and Medical Microbiology* 35: 207-213.

Francois, P., Bento, M., Vaudaux, P., and Schrenzel, J. (2003) Comparison of fluorescence and resonance light scattering for highly sensitive microarray detection of bacterial pathogens. *Journal of Microbiological Methods* 55: 755-762.

Glaser, P., Frangeul, L., Buchrieser, C. et al. (2001) Comparative Genomics of *Listeria* Species. *Science* 294: 849-852.

Hitchins, A.D. 1995. *Listeria monocytogenes*. In bacteriological Analytical Manual, 8th ed AOAC International, Arlington, VA, pp. 10.01-10.13.

Hu, M. K. (1962). "Visual pattern recognition by moment invariants." *IRE Trans. Inform. Theory* IT 8: 179-187.

Jaradat, Z.W., Schutze, G.E., and Bhunia, A.K. (2002) Genetic homogeneity among *Listeria monocytogenes* strains from infected patients and meat products from two geographic locations determined by phenotyping, ribotyping and PCR analysis of virulence genes. *International Journal of Food Microbiology* 76: 1-10.

Jones, D.D. et al., (1994) Detection of foodborne microbial pathogens. In: *PCR Technology: Current Innovations* pp. 341.

Leonard, P., Hearty, S., Brennan, J., Dunne, L., Quinn, J., Chakraborty, T., and O'Kennedy, R. (2003) Advances in biosensors for detection of pathogens in food and water. *Enzyme and Microbial Technology* 32: 3-13.

Liswith, M.L., Bawolek, E.J., and Hirleman, E.D. (1996) Modeling of light scattering by submicrometer spherical particles on silicon and oxidized silicon surfaces. *Optical Engineering* 35: 858-869.

Nebeker, B.M., de la Pena, J.L., and Hirleman, E.D. (2001) Comparisons of the discretedipole approximation and modified double interaction model methods to predict light scattering from small features on surfaces. *Journal of Quantitative Spectroscopy & Radiative Transfer* 70: 749-759.

Nourrit,V., de Bougrenet de la Tocnaye, J.-L., and Chanclou, P. (2001) Propagation and diffraction of Gaussian beams. *Journal of Optical Society of America A*, 18: 546-556.

Perkins, E.A., and Squirrell, D.J. (2000) Development of instrumentation to allow the detection of microorganisms using light scattering in combination with surface plasmon resonance. *Biosensors & Bioelectronics* 14: 853-859.

Peruski, L. and Peruski, A. H. (2003.). "Rapid diagnostic assays in the genomic biology era: detection and identification of infectious disease and biological weapon agents." *Botechniques* 35: 840-846.

Pine, L., Malcom, G.B., Brooks, J.B., and Daneshvar, M.I. (1989) Physiological studies on the growth and utilization of sugars by *Listeria* species. *Canadian Journal of Microbiology* 35: 245-254.

Salzman, G.C., Griffith, J.K., and Gregg, C.T., (1982) Rapid identification of microorganisms by circular-intensity differential scattering. *Applied and Environmental Microbiology* 44: 1081-1085.

Schmehl, R., Nebeker, B.M., and Hirleman, E.D. (1997) Discrete-dipole approximation for scattering by features on surfaces by means of a two-dimensional fast Fourier transform technique. *Journal of the Optical Society of America a—Optics Image Science and Vision* 14: 3026-3036.

Suhling M, A. M., Hunziker P, Unser M. (2004). Multiresolution moment filters: theory and applications. *IEEE Trans Image Process*. 13(4):484-95.

Stüll, V.R. (1972) Size distribution of bacterial cells. *Journal of Bacteriology* 109: 13011303.

Swaminathan, B., and Feng, P. (1994) Rapid Detection of Food-Borne Pathogenic Bacteria. *Annual Review of Microbiology* 48: 401-426.

Teague, M. R. (1980). Image analysis via the general theory of moments. J. *Optical Society of America* 70 (8): 920-930.

Van de Merwe, W.P., Huffman, Dr., and Bronk, B.V. (1989) Reproducibility and Sensitivity of Polarized-Light Scattering for Identifying Bacterial Suspensions. *Applied Optics* 28: 5052-5057.

Van de Merwe, W.P., Li, Z.Z., Bronk, B.V., and Czege, J. (1997) Polarized light scattering for rapid observation of bacterial size changes. *Biophysical Journal* 73: 500-506.

Vazquez-Boland, J.A., Kuhn, M., Berche, P., Chakraborty, T., Dominguez-Bernal, G., Goebel, W., Gonzalez-Zorn, B., Wehland, J., and Kreft, J. (2001) *Listeria* pathogenesis and molecular virulence determinants. *Clinical Microbiology Reviews* 14: 584-640.

Volokhov, D., Rasooly, A., Chumakov, K., and Chizhikov, V. (2002) Identification of *Listeria* Species by Microarray-Based Assay. *J. Clin. Microbiol*. 40: 4720-4728.

Waltham, C., Boyle, J., Ramey, B., and Smit, J. (1994) Light-Scattering and Absorption Caused by Bacterial-Activity in Water. *Applied Optics* 33: 7536-7540.

Warner, T.L., and Hirleman, E.D. (1997) Toward classification of particle properties using light scattering techniques. *Journal of the Institute of Environmental Sciences* 40: 15-21.

Darzynkiewicz Z et al (2000) Analysis of apoptotic cells by flow and laser scanning cytometry. Methods Enzymol, vol. 322, pp. 18-39.

(56) References Cited

OTHER PUBLICATIONS

Wyatt, P.J. (1969) Identification of bacteria by differential light scattering. *Nature 221*: 1257-1258.

Bayraktar, B., et al., "Feature extraction from light-scatter patterns of *Listeria* colonies for identification and classification," Journal of Biomedical Optics, 2006, pp. 1-23.

* cited by examiner

SYSTEM AND METHOD OF ORGANISM IDENTIFICATION

RELATED APPLICATIONS

The present application claims the benefit of U.S. provisional application Ser. No. 60/880,576, filed on Jan. 16, 2006, which is incorporated herein by reference. This application is also related to U.S. application Ser. No. 11/291,078, filed on Nov. 30, 2005, which is incorporated herein by reference.

FEDERALLY SPONSORED RESEARCH OR DEVELOPMENT

Parts of this invention may have been made with Government support under a contract from United States Department of Agriculture (USDA). The Government may have certain rights in the invention.

TECHNICAL FIELD

This application relates to a system and method of characterizing and classifying and identifying colonies of microorganisms, clusters of cells, or organelles.

BACKGROUND

Pathogenic bacterial contamination in products not only puts the public at risk, but also is costly because of routine product testing, product recalls and liabilities. When responding to incidents of food contamination or other bacteriological contamination, the speed and accuracy of the identification of the organism can be of importance. At present, typical systems and methods of making such identification include polymerase chain reaction (PCR), or antibody-based techniques, which require complicated sample preparation in order to achieve reliable results.

Traditional methods for detection and identification of bacterial contaminants, such as *Listeria monocytogenes*, usually take 24-48 h following the growth of bacteria on an agar plate or in a culture broth, owing to the extent of biochemical or molecular testing required for confirming the identity of the culture. Nucleic acid or antibody-based methods have been successful and are used for pathogen detection by some large food manufacturers and by regulatory agencies. However, the ability of these methods to differentiate live from dead bacteria and specificity of different strains of closely related species, such as *Listeria*, are of concern.

Another commonly used method for bacterial detection is the classical culture method where test samples are enriched and plated on agar plates for identification of individual colonies by biochemical or serological assays. The assays for identification of the bacterial colonies require multiple steps, use sophisticated and expensive molecular tools and require a skilled technician to perform the tests.

BRIEF SUMMARY

A system and method for the characterization of bacteria or other organisms cultured in colonies, cell colonies such as stem cells or islets, using forward light scattering is disclosed. A colony of bacteria or other organisms may be illuminated with coherent light, and the light scattered in the forward direction may be detected and analyzed. The forward-scattered light patterns (scattergrams) may be characterized and associated with previously determined features associated with known organisms. The process may be performed in an automated manner.

Substantially coherent light from a source such as a semiconductor laser or other laser type may be used to create a scattergram arising from the interaction of the incident light with a colony of an organism. An image of the forward-scattered light pattern may be recorded by a camera or similar device, and the image may be characterized by pattern recognition and computer-vision techniques so as to the classify scattergrams arising from the illumination of the colony with laser light.

In an aspect, a plurality of images of a specific colony type associated with a specific genotype may be analyzed so as to determine the identifying characteristics or features extracted from the image by numerical analysis methods, so as to train a characterizing algorithm to identify the genotype of a colony sample of an unknown organism.

A variety of feature extraction algorithms may be used, either individually or in combination so as to characterize an image. Forward scattergrams of the colony may exhibit generally circular symmetry, and algorithms such as Zernike and Chebyshev (alternatively spelled Tchebichef) moments may be used. As the scattergrams may also exhibit textures, and another set of characterizing data may be obtained using so-called Haralick texture features.

The values of the moment invariants (features) may be represented by a vector of features (scalar values) extracted from the image and then compared with criteria established by training an recognition algorithm with known data sets so as to identify the genotype of an organism or the properties of the organism, such as pathogenicity.

These techniques may be used to categorize the genotypes of organisms collected from, for example, samples of food, tissue, water, or air.

A system for the identification of microorganisms is disclosed, including a coherent light source, and a holder adapted to receive a substrate having a surface adapted for growth of microorganisms. The relative position of the holder and the light are adjustable such that light from the light source impinges on a selectable location of the substrate. An image capture device may be disposed to receive light forward scattered by a colony of microorganisms. A first computer may be configured to extract a feature vector from the image.

A method of identifying microorganisms is disclosed, including obtaining image data of a scattergram of a microorganism colony; analyzing the image data; and, categorizing the analyzed image data to identify a type of the microorganism colony.

A computer program product is disclosed, the product being stored or distributed on a computer readable medium, and including instructions causing a computer to acquire scattergram image data from an imaging device; characterize the image to produce a feature vector of the image data; and categorize the image using the feature vector and process that has been trained by using feature vectors previously obtained from colonies of a known genotype.

In another aspect, a computer program product is disclosed, the product being stored or distributed on a computer readable medium, including instructions causing a computer to acquire scattergram image data from an imaging device; characterize the image to produce feature vectors of the image data; train a categorization process using by using feature vectors obtained from colonies of a known genotype.

While the examples shown are for bacteria, the apparatus and method is equally usable to identify or classify other organic matter exhibiting structural features including, but not limited to, stem cell colonies, or preparations of islets.

BRIEF DESCRIPTION OF THE DRAWINGS

The accompanying drawings, which are included to provide a further understanding of the invention, illustrate embodiment(s) of the invention and together with the description serve to explain the principle of the invention.

DETAILED DESCRIPTION

Figure 1:
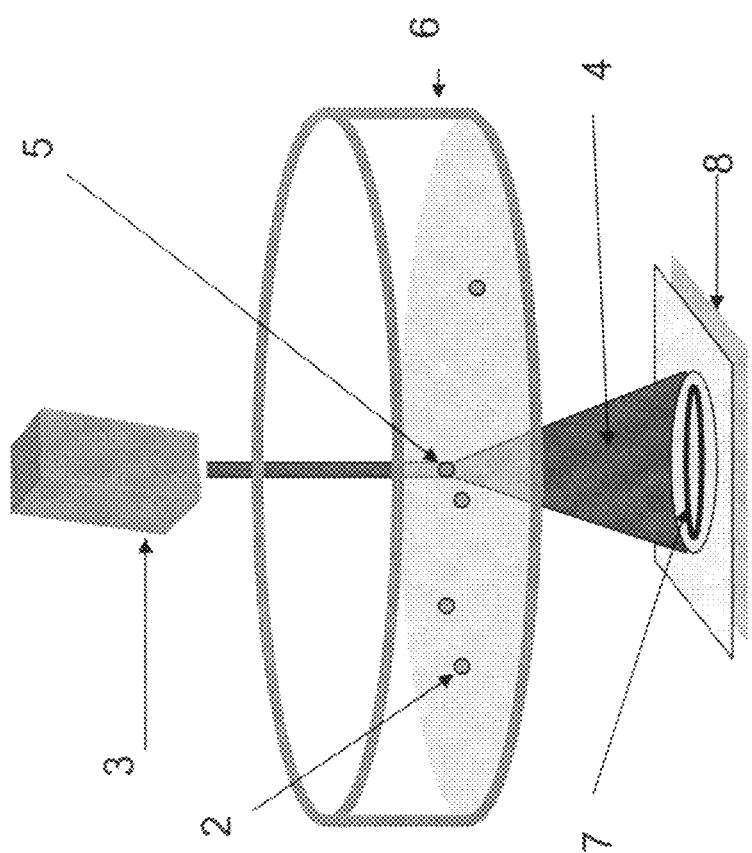
FIG. 1 is a schematic representation of the process of producing a scattergram of a colony of biological material.

Exemplary embodiments may be better understood with reference to the drawings, but these embodiments are not intended to be of a limiting nature. Like numbered elements in the same or different drawings perform equivalent functions. The embodiments and methods described are generally described being for the identification of bacterial colonies; however the invention may also be used for identification and characterization of other organisms or organic matter and is not limited to bacteria or the bacterial examples described below. Herein, the term organism includes any biological material that may form or be prepared so as to form a mass.

The method includes: obtaining scattergram images; feature extraction; and, classification.

A colony of a sample organism may be grown on a substrate according to a protocol. The growth conditions and the substrate may vary, depending on the specific type of the bacteria or other microorganism. A colony 5 of what may be a plurality of colonies 2 may be disposed so as to be illuminated by an optical radiation source 3, where the optical wavelength regime may be one or more wavelengths in the range of about 300 nm to about 800 nm. The optical radiation may be generated by a laser source, which may be a semiconductor laser, a gas laser, or the like. Laser light sources are known to have a coherent radiation characteristic. The coherence of each type of laser may be different, and may vary with such parameters as the laser current. For this reason, it should be understood that the term "coherent" light source encompasses a substantially coherent light source.

Light is backscattered, transmitted and forward scattered 4 by the specimen colony 5 being illuminated. The illuminated object may include the colony, a growth medium and a support structure 6, such as a Petri dish. The light pattern formed by the forward scattered light 4 is termed a "scattergram" 7.

Forward-scattered light may be recorded by a camera or similar device. The camera may use film, or electronic means such as a charge coupled device (CCD) 8 or complementary metal oxide semiconductor (CMOS), or the like, to record the forward-scattered image on film, in a memory, or similar device. Although the experimental results described herein were obtained using a single optical wavelength, the use of multiple optical wavelengths should result in additional information, as the relative scale size of internal structure, the refractive index, and transmissivity of the sample will change as a function of the wavelength of illumination. The pattern and intensity of the forward-scattered light 4 (a scattergram 7) may be analyzed to provide a characterization of organism or colony being illuminated.

Figure 2:
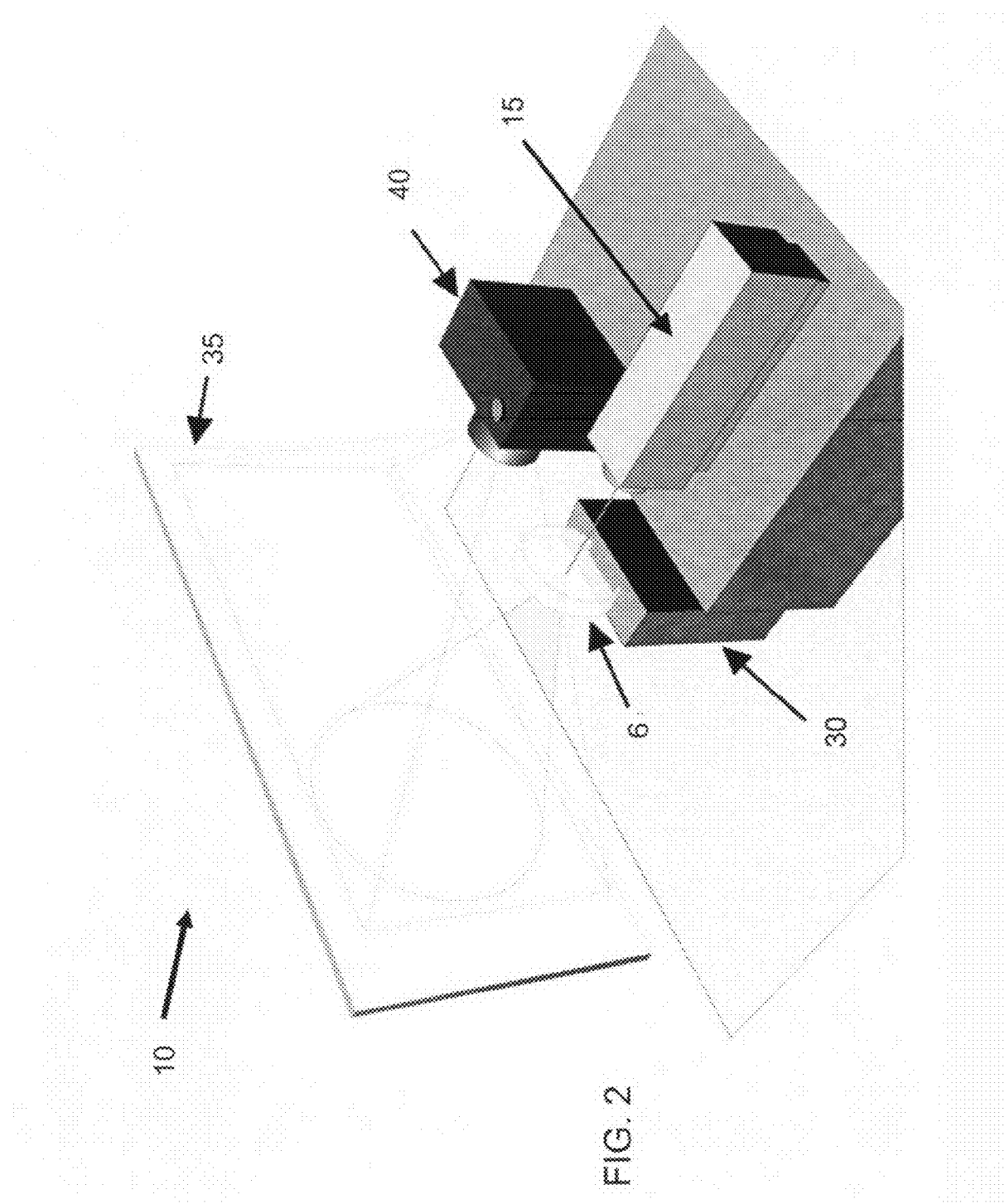
FIG. 2 is a perspective view of a system of an apparatus for obtaining scattergrams of organic material samples.

FIG. 2 illustrates aspects of the measurement apparatus 10 used in the experiments described herein, in which a laser diode 15 emitting light at a wavelength of 635 nm (Lasiris 501L-635-1 mW from Stocker Yale, Inc., Salem, N.H.) is positioned such that a beam of light output from the laser is directed onto one of the colonies of organisms which may have been cultured on a medium on a substrate, and held in a sample holder 30. The thickness of the colony being illuminated is selected such that a portion of the light penetrates to the far side thereof, and the growth medium is sufficiently transmissive at the illuminating wavelength that the light passing through the colony and the light forward scattered by the colony may be displayed on a detection screen 35, and the scattergram image recorded by a camera 40, or directly by a charge coupled device (CCD) such as a SI1280 FM-CL (from Silicon Imaging, Costa Mesa, Calif.), or other equivalent device.

In the experiments, for convenience in data processing, the images were cropped to 300×300 pixels by centering the substantially circularly symmetrical scattergram in, for example, a rectangle. This was performed manually in some experiments and automatically in other experiments. Other image sizes may be used.

A detection screen may be useful for visualizing the data where the forward-scattered light is caused to impinge on the surface of the screen and is viewed by a camera or equivalent sensing device; however, the forward propagated and forward-scattered light may be caused to impinge directly on a camera or a lens and image plane such that it may be imaged and recorded. In FIG. 2, a Petri dish 6 containing the sample is placed between the laser 15 and a detection screen 35, and the forward-scattered light intercepted by the detection screen 35. The detection screen 35 may be a simple surface or one that is treated so as to respond to the light by re-radiating in another wavelength regime. A camera 40 may be disposed so as to capture an image of the detection screen 35, including the forward-scattered light 4. The laser 15 produces a collimated light beam. In the experiments described as examples herein, the beam is of the order of 1 mm in diameter (at the $1/e^2$ irradiance points) and directed through the center of a bacterial 5 colony along an optical path, and thence through the growth medium and a substantially transparent support. The substantially transparent support may be, for example, a Petri dish. The diameter of the laser beam at the distance of the colony is chosen for experimental convenience, and the colony sizes used were about 1.8 mm in diameter. The dimensions should not be taken as limiting.

In the experimental apparatus, the distance from the laser to the Petri-dish holder was 100 mm and the distance from the Petri-dish holder to the detection screen was 280 mm. Persons skilled in the art will appreciate that these distances merely represent one of a wide variety of spacings and geometrical arrangements to achieve similar results. Such features as vibration reducing mounting, automated or motor driven adjusting devices such as a three-axis stepping motor (Velmex NEMA 17, from Velmex, Bloomfield, N.Y.) to orient the beam location, and the like, may be incorporated in the apparatus. The adjusting device may be part of the sample holder 30.

For some of the experiments, the laser beam was positioned with respect to the colony manually, while in other experiments, motorized stages were used. In some experiments the colonies were located using a laser equipped with a single line projector (Lasiris 501L-635-5 mW) and a line scanner (Hamamatsu 512 pixel, 25 μm pitch, 2.5 mm length, from Hamamatsu, Bridgewater, N.J.). The line scanner optics employed two cylindrical lenses (f=198 mm) and produced a laser line of 100 mm×0.5 mm. The laser line scan produced a 2-D transmission map of the substrate plates on which the colonies were cultured, and was used to identify the centers of the colonies. Alternatively a camera system such as an Alta U260 (Apogee Instruments, Auburn Calif.) using reflected light may be used. In another aspect, non-monochromatic light, or monochromatic light at a wavelength different from the scattergram wavelength may be used for colony sizing and location purposes.

Further, the diameter of the light beam may be changed so as to intercept a greater or lesser portion of a colony, and the beam intensity may be varied in accordance with the optical transmission losses and the sensitivity of the camera apparatus. Other optical elements including, but not limited to, lenses, polarizing filters, quarter-wave plates, wavelength-dependent filters and the like may be placed in the optical path.

The system may be automated such that, for example, a user places a sample in sample holder and the system moves the sample (e.g., with an automated x-y stage), illuminates the sample using the optical source, analyzes the scattergram, and tabulates, displays, or otherwise provides the results to the user without the need for manual intervention.

Figure 3:
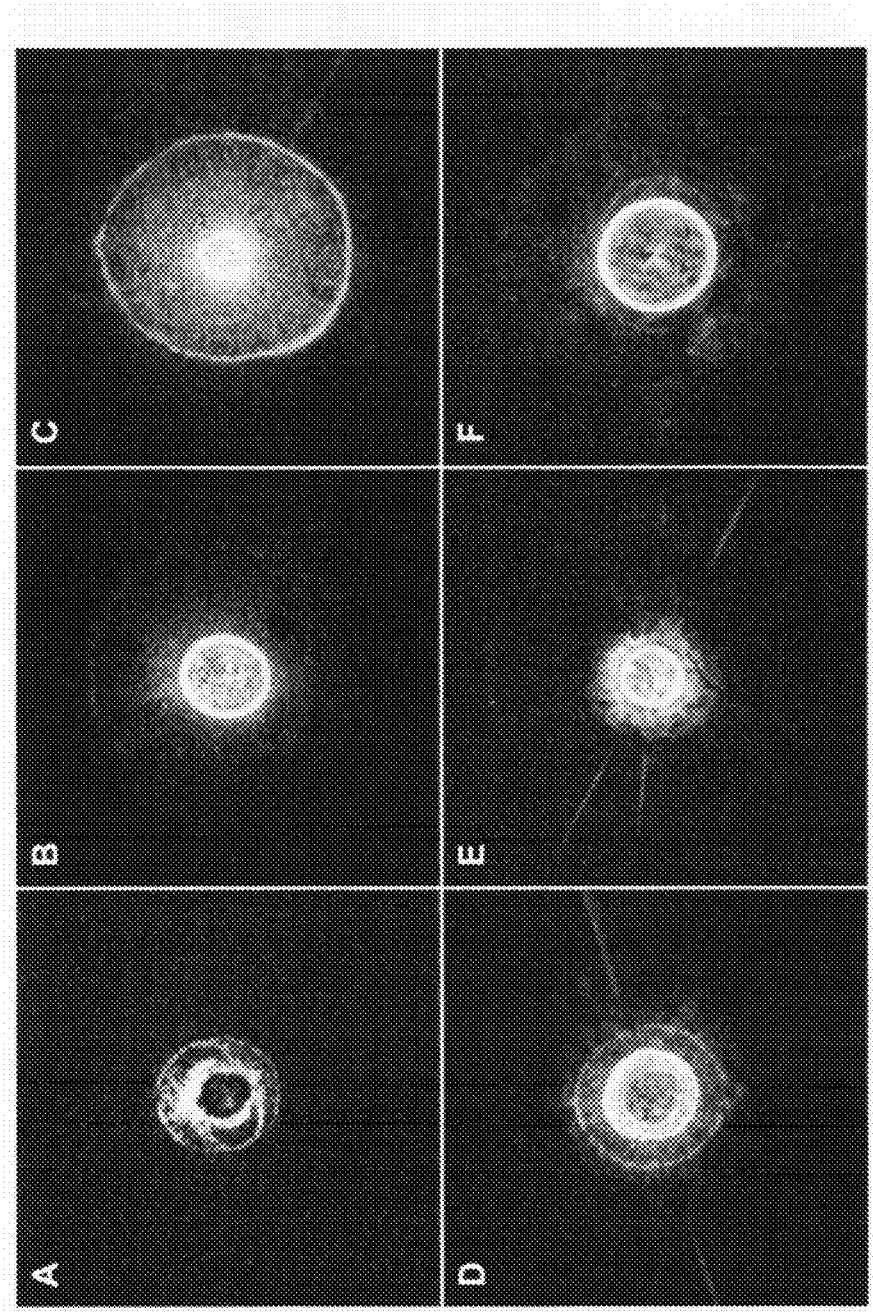
FIG. 3 illustrates representative images of scattergrams produced specific strains of six different *Listeria* species (A—*L. grayi* LM37, B—*L. innocua* C3-3(L), C—*L. ivanovii* V12, D—*L. monocytogenes* GG8, E—*L. seeligeri* SE21, and F—*L. welshimeri* 105(2)-2L)

Scattergrams resulting from the illumination of species of *Listeria* are shown in FIG. 3. The optical images have been subject to adaptive histogram equalization (the adapthisteq function in Matlab, available from The MathWorks, Inc., Natick, Mass.) as applied to a grey scale image in order to optimize the local contrast. Generally, the scattergrams obtained are characterized by a circular symmetry, although otherwise differing in detail.

In an aspect, the scattergram images may be characterized by applying a azimuthally invariant orthogonal moment technique, such as that known as a Zernike moment invariant, to obtain a vector characteristic of the sample. Generally, lower-order Zernike moments quantify low-frequency components (which may be considered as "global characteristics") of an image and higher-order moments represent the high-frequency contents (which may be considered as "fine details"). Therefore, there is always a tradeoff between the desired level of image details that can be analyzed, and the order of the moments to be used. A 20th order analysis yields a vector having 120 components. Images may be translated so that the center of the scatter pattern is at the center of the image. To compute the Zernike moments of a given image, the center of the image is taken as the origin and pixel coordinates are mapped to the range of the unit circle.

The magnitude of a Zernike moment is azimuthally invariant, so that the affect of azimuthal variations of the image are minimized. Other similar analytical techniques, such as discrete Krawtchouk or radial Chebyshev polynomials or continuous pseudo-Zernike polynomials may be used, and may be adapted to similar analytical use. In some of the experiments radial Chebyshev polynomials were used.

As with all digital data processing, the resolution of the image, the granularity of the calculations and the accuracy of the numerical analysis algorithms are chosen as a balance between accuracy, noise generation, memory capacity, computation speed and the like, and differing parametric values and specific analytic techniques may be chosen by persons skilled in the art to perform the functions of the method and system disclosed herein.

In addition to the substantial azimuthal symmetry shown by the experimental data, such as that shown in FIG. 3, the scattergrams may also exhibit a texture. One method of texture analysis is a so-called Haralick feature analysis. This is a grey-scale co-occurrence matrix (GLCM). Such GLCM analysis may be used to quantify the number of occurrences at various distances and angles of pixel intensity values with respect to each other. Using such analysis, image features as angular second moment, contrast, sum average, sum variance, inverse difference moment, sum of squares (variance), entropy, sum entropy, difference entropy, difference variance, information measure of correlation, and maximum correlation coefficient may be calculated.

Selection among extracted scattergram features encompasses tradeoffs between desired properties. For example, a higher order of moment invariant provides more sensitivity but also makes the features more susceptible to noise. Therefore, feature reduction may be performed to select the most distinctive features. Feature reduction may be divided into categories: feature selection, in which features carrying the most information are picked out through some selection scheme, and feature recombination, in which some features are combined (e.g., with different weights) into a new (independent) feature.

The dimensionality of the feature vector of the Zernike moments obtained may be reduced by techniques such as principal component analysis (PCA), non-linear iterative partial least squares (NIPALS), stepwise discriminant analysis (SDA) or other similar methods in order to plot the data in a two or three dimensional form and to visualize data clusters representing different bacterial colonies.

The feature vectors may be clustered by unsupervised machine learning methods such as K-Mean clustering, Ward's hierarchical clustering, Kohonen's self-organizing maps or similar methods. The feature vectors may be also classified by supervised learning methods such as linear or quadratic discriminant analysis (LDA, QDA), neural networks (NNs), or support vector machines (SVM).

SVMs are based on the concept of decision hyperplanes that define decision boundaries. An optimal decision hyperplane may be defined as a decision function with maximal margin between the vectors of two classes. SVMs are a set of related supervised learning methods used for classification and regression. They belong to a family of generalized linear classifiers.

A property of SVMs is that they simultaneously minimize the empirical classification error and maximize the geometric margin; hence they are also known as maximum margin classifiers.

Support vector machines map input vectors to a higher dimensional space where a maximal separating hyperplane is constructed. Two locally parallel hyperplanes are constructed on each side of the hyperplane that separates the data. The separating hyperplane is the hyperplane that maximizes the distance between the two locally parallel hyperplanes.

In a first experimental example, the bacterial strains used for experimental purposes were *L. monocytogenes* ATCC19113, *L. innocua* ATCC33090, *L. ivanovii* ATCC11919, *L. welshimeri* ATCC35897 (obtained from ATCC, Manassas, Va.), *L. grayi* LM89, *L. grayi* LM37, *L. ivanovii* V12, *L. ivanovii* V199 (obtained from VICAM, Watertown, Mass.), *L. monocytogenes* F4393, *L. innocua* F4248 (obtained from USDHHS Centers for Disease Control and Prevention, Atlanta, Ga.), *L. monocytogenes* LCDC81-861, *L. innocua* C3-3(L), *L. ivanovii* LA29, *L. welshimeri* 105 (2)-2(L) (obtained from USDA Agricultural Research Service, Washington, D.C.), *L. monocytogenes* GG8, *L. seeligeri* LA15, *L. seeligeri* SE31 (obtained from Purdue Department of Food Science culture collection), and *L. innocua* NCTC11288 (obtained from Dr. T. Chakraborty, Univ. of Giessen, Germany).

The bacterial cultures were serially diluted in sterile 20 mM phosphate buffered saline, pH 7.4 (PBS), so that the dilutions would produce about 30-50 colonies per plate. The diluents were evenly distributed on the surface of BHI agar plates in duplicate and were incubated at 37° C. for 18-36 h or until the colony reached 1.8 to 2 mm in diameter. The thickness of the colony (along the optical axis) was measured from the surface profile data obtained by a laser triangulation probe (Microtrak II Laser Displacement Sensor System, MTI instruments Inc., Albany, N.Y.), and was typically around 0.3 to 0.4 mm.

Approximately 2000 scattergrams were collected during the course of the experiment. Generally, the scattergrams of *Listeria* colonies were circularly symmetric and composed of a number of diffraction-like rings. In the majority of scattergrams a bright spot at the center of the pattern was observed. However, this spot was absent in some strains, or appeared diffuse in some others. The size and sharpness of the central spot varied in scattergrams obtained from different strains. Typically, at least one ring surrounding the central spot was observed; for some strains there were two, three, or more rings. The size, thickness, sharpness, and intensity of the ring(s) varied. A diffuse pattern around the innermost ring was observed in some scattergrams. In some other images, radial spokes were present outside the innermost ring. The intensity of the whole scatter pattern also varied from strain to strain.

In the example shown in FIG. 3, a single strain of bacteria was chosen to represent each species of *Listeria* bacteria (*L. monocytogenes, L. innocua, L. ivanovii, L. grayi, L. seeligeri,* and *L. welshimeri*). From available images of each strain, 9 to 20 individual images were selected at random (total of 89 images) and 120 feature vectors were extracted from each of these images. The principal components of each image were determined using the original feature vector for each image.

Figure 4:
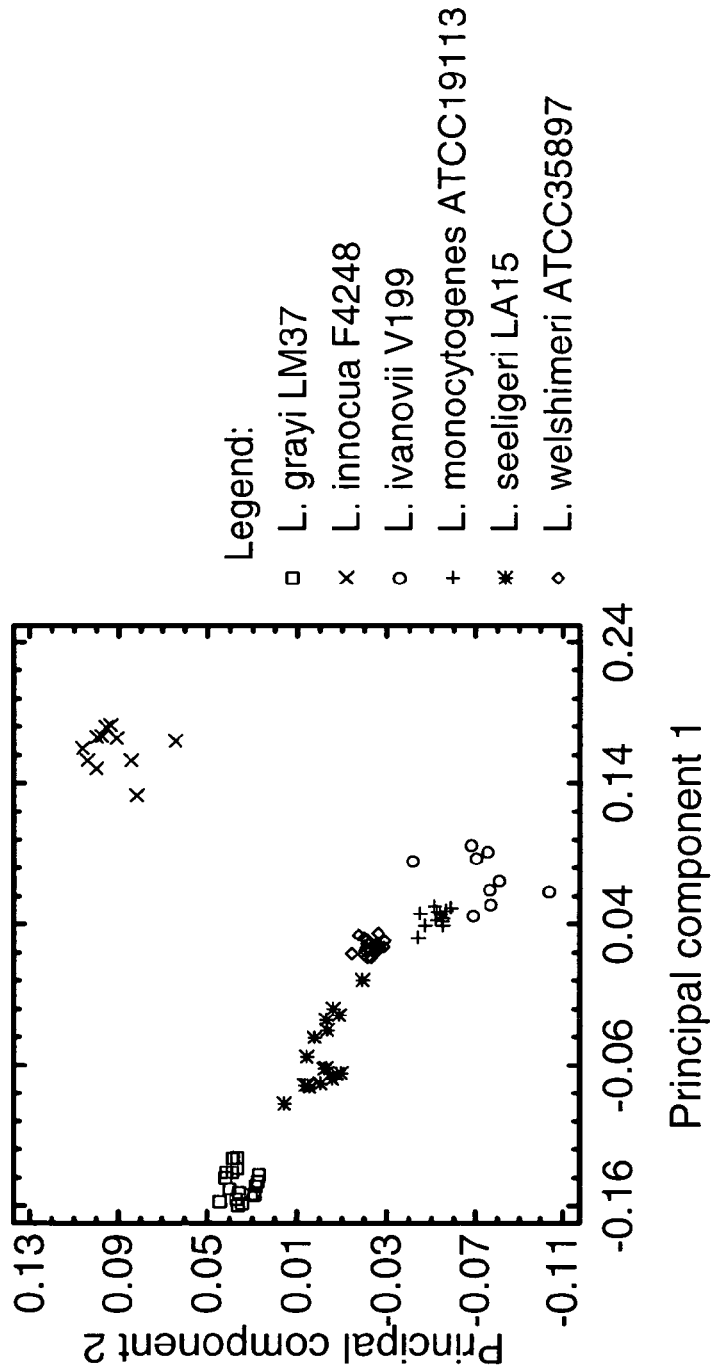
FIG. 4 illustrates a principal component analysis (PCA) of the scattergrams of the species of FIG. 2 using Zernike moment invariant features; the data represents 89 scattergrams.
Figure 5:
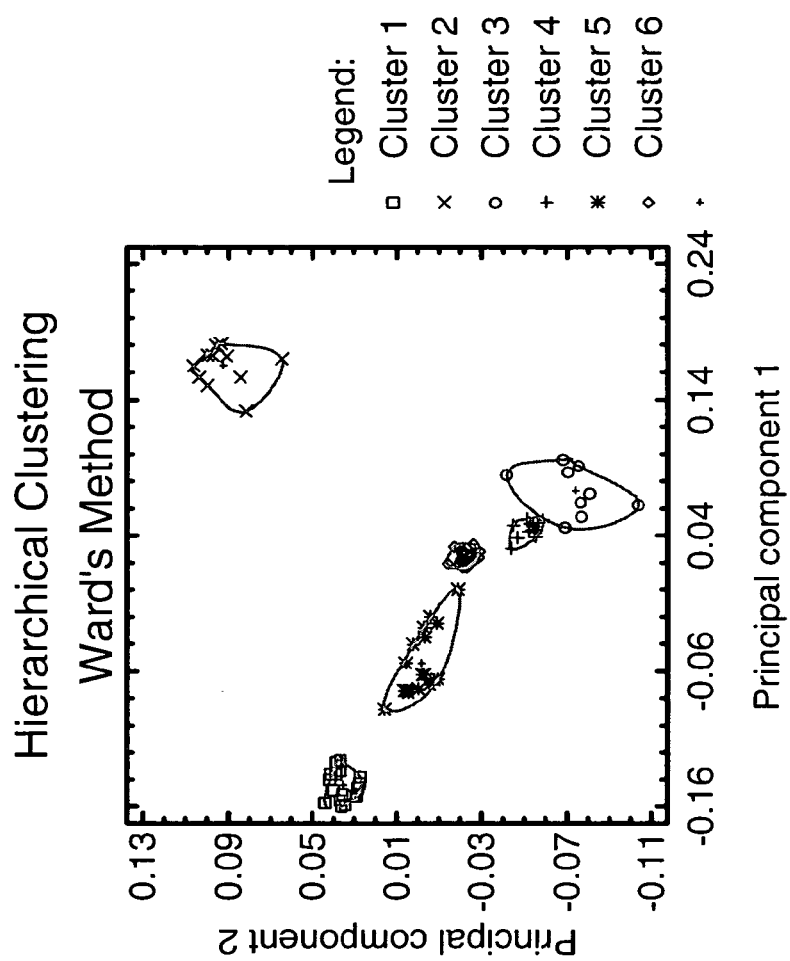
FIG. 5 illustrates hierarchical clustering (Ward's method) of the scattergrams of the species of FIG. 2, using the first 5 principal components of the feature vectors.

FIG. 4 shows the first and the second principal components with different species (and strains) marked by different symbols. All of the species were well separated. A K-Means clustering algorithm (using city block distance) differentiated properly between *L. grayi, L. monocytogenes,* and *L. ivanovii,* but it was unable to recognize the difference between *L. seeligeri* and *L. welshimeri*. However, a hierarchical clustering approach (Ward's method, Euclidean distance) using the first 5 principal components of the feature vectors separated each of the species (*L. monocytogenes, L. innocua, L. ivanovii, L. grayi, L. seeligeri,* and *L. welshimeri*) with 100% accuracy (see FIG. 5). Although *L. monocytogenes* and *L. innocua* are known to be closely related phylogenetically, the features computed from scattergrams produced by colonies of *L. monocytogenes* and *L. innocua* were clearly distinguishable on the PCA plots.

Figure 6:
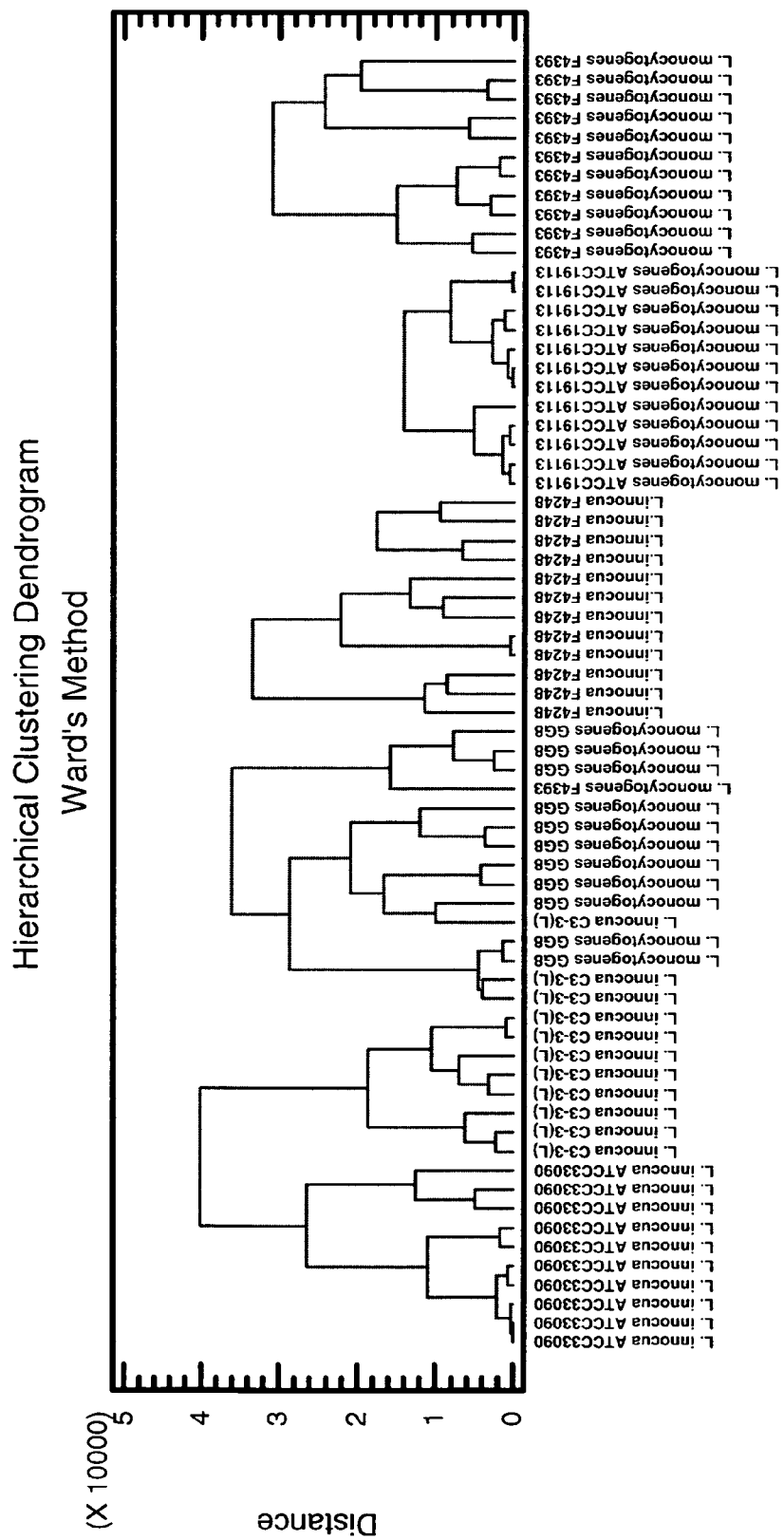
FIG. 6 illustrates the hierarchical clustering of scatter patterns produced by different strains of bacteria belonging to *L. innocua* and *L. monocytogenes* species by Ward's method.

In another example, demonstrating an ability to discriminate among closely related species, a more complex set of data (68 observations) containing three different strains of *L. monocytogenes* and three different strains of *L. innocua* was analyzed. Hierarchical clustering (Ward's method) separated the analyzed strains modestly well, although some errors were noted. *L. innocua* ATCC33090 and *L. innocua* C3-3(L) were assigned to the same cluster (FIG. 6). Some scattergrams of *L. innocua* C3-3(L) (a nonpathogenic strain of *Listeria*) were assigned to the cluster containing *L. monocytogenes* GG8 (a pathogenic strain). The same dataset was classified using supervised learning and classification by linear discriminant analysis (LDA) (Table 1), and support vector machine (SVM) (Table 2). The classification success was tested with a 2×5 cross-validation, and 0.632 bootstrap methods. The average error determined by cross-validation was 8.82%, whereas the average error rate determined by the bootstrap algorithm was 5.93%, with 7.6% for LDA approach, and 4.4% for SVM approach.

TABLE 1

LDA classification of *Listeria* spp. The strains present are *L. monocytogenes* F4393, *L. monocytogenes* GG8, *L. monocytogenes* ATCC19113, *L. innocua* ATCC33090, *L. innocua* C3-3(L), and *L. innocua* F4248.

| | | Predicted strains | | | | | | | | | |
|---|---|---|---|---|---|---|---|---|---|---|---|
| Measured strains | Group size | *L. innocua* ATCC33090 | | *L. innocua* C3-3(L) | | *L. innocua* F4248 | | *L. monocytogenes* ATCC19113 | | *L. monocytogenes* F4393 | | *L. monocytogenes* GG8 |
| *L. innocua* ATCC33090 | 50 | 48 | 96.00% | 0 | | 0 | | 2 | | 0 | | 0 |
| *L. innocua* C3-3(L) | 55 | 7 | | 41 | 74.55% | 0 | | 0 | | 0 | | 7 |
| *L. innocua* F4248 | 60 | 0 | | 0 | | 60 | 100.00% | 0 | | 0 | | 0 |
| *L. monocytogenes* ATCC19113 | 60 | 0 | | 0 | | 0 | | 60 | 100.00% | 0 | | 0 |
| *L. monocytogenes* F4393 | 60 | 0 | | 0 | | 0 | | 0 | | 55 | 91.67% | 5 |
| *L. monocytogenes* GG8 | 55 | 0 | | 4 | | 0 | | 4 | | 1 | | 46 | 83.64% |

TABLE 2

SVM classification of *Listeria* spp. The strains present are *L. monocytogenes* F4393, *L. monocytogenes* GG8, *L. monocytogenes* ATCC19113, *L. innocua* ATCC33090, *L. innocua* C3-3(L), and *L. innocua* F4248.

| Measured strains | Group size | Predicted strains |||||||||||
|---|---|---|---|---|---|---|---|---|---|---|---|
| | | *L. innocua* ATCC33090 | | *L. innocua* C3-3(L) | | *L. innocua* F4248 | | *L. monocytogenes* ATCC19113 | | *L. monocytogenes* F4393 | | *L. monocytogenes* GG8 |
| *L. innocua* ATCC33090 | 50 | 46 | 92.00% | 3 | | 0 | | 1 | | 0 | | 0 |
| *L. innocua* C3-3(L) | 55 | 4 | | 41 | 74.55% | 0 | | 0 | | 0 | | 10 |
| *L. innocua* F4248 | 60 | 0 | | 1 | | 59 | 98.33% | 0 | | 0 | | 0 |
| *L. monocytogenes* ATCC19113 | 60 | 0 | | 0 | | 0 | | 60 | 100.00% | 0 | | 0 |
| *L. monocytogenes* F4393 | 60 | 0 | | 0 | | 0 | | 0 | | 55 | 91.67% | 5 |
| *L. monocytogenes* GG8 | 55 | 0 | | 0 | | 0 | | 0 | | 2 | | 53 | 96.36% |

In yet another example, an automated recognition of pathogenicity is demonstrated. 180 scattergrams belonging to colonies of 15 different strains (*L. monocytogenes* ATCC 19113, *L. monocytogenes* F4393, *L. monocytogenes* LCDC81-861, *L. grayi* LM37, *L. grayi* LM89, *L. seeligeri* LA15, *L. seeligeri* SE31, *L. innocua* NCTC 11288, *L. innocua* C3-3(L), *L. innocua* F4248, *L. ivanovii* ATCC11919, *L. ivanovii* LA29, *L. ivanovii* V12, *L. welshimeri* 105(2)-2(1), and *L. welshimeri* ATCC35897) were randomly chosen, forming an observation set. The data set was divided into three categories representing nonpathogenic *Listeria*, bacteria potentially pathogenic to humans (3 strains of *L. monocytogenes*), and bacteria potentially pathogenic to animals (3 strains of *L. ivanovii*). Classification was performed utilizing LDA, NNs, and SVM. The error rate tested with the 0.632 bootstrap method depended on the classification approach, and varied from 13 to 7.2% (Table 3).

TABLE 3

Classification of various *Listeria* strains using LDA, NNs, and SVM methods.

| scattergram | Classified as... |||
|---|---|---|---|
| | human pathogen | nonpathogenic | animal pathogen |
| Linear Discriminant Analysis ||||
| human pathogen | 70.56% | 23.89% | 5.56% |
| nonpathogenic | 7.59% | 89.81% | 2.59% |
| animal pathogen | 4.44% | 7.78% | 87.78% |
| Neural Network ||||
| human pathogen | 62.22% | 33.89% | 3.89% |
| nonpathogenic | 3.89% | 94.44% | 1.67% |
| animal pathogen | 8.89% | 10.00% | 81.11% |
| Support Vector Machine ||||
| human pathogen | 73.89% | 21.11% | 5.00% |
| nonpathogenic | 3.15% | 95.19% | 1.67% |
| animal pathogen | 7.22% | 7.22% | 85.56% |

Classifier 0.632 bootstrap
Linear Discriminant Analysis 13.08%
Neural Network 8.90%
Support Vector Machine 7.72%

The separation of scattergram images into distinct associations with individual strains or classes of pathogenicity makes it possible to establish a data base of features associated with known (reference) experimental measurements on the organisms of interest to a user, and to use analytical methods to compare the scattergram of the unknown sample with that of the data base in order to achieve a high reliability identification. This association may be done on a completely automated basis, if desired.

Other experimental examples used discrete Chebyshef moments and Haralick descriptors in addition to the Zernike moments. A recognition system was trained using data sets using data sets of at least 100 forward scatter patterns per class of bacteria (strain, species or genus). In an example, a data set comprised of a total of 2234 scatter patterns belonging to five different bacteria. The selected cultures were *Listeria* spp. (*L. monocytogenes* 19113, *L. monocytogenes* V7, *L. monocytogenes* ATCC 7644, *L. welshimeri* ATCC 35897, *L. innocua* F4248, and *L. ivanovii* ATCC 19119); *Staphylococcus* spp., (*Staph. aureus* ATCC 13301, *Staph. aureus* 103, *Staph. aureus* S41, *Staph. epidermidis* 302, *Staph. epidermidis* ATCC 35547, and *Staph. hyicus* T6346), *Salmonella* spp. (*S. enteritidis* PT28, *S. enteritidis* PT4, *S. enteritidis* ATCC 13096, *S. agona*, *S. Copenhagen*, and *S. tennessee*), and *Vibrio* spp. (*V. alginolyticus*, *V. campbelli*, *V. cincinnaticus*, *V. hollisae*, *V. orientalis*, and *V. parahaemolyticus*).

To demonstrate classification success on the genus level, all the tested bacterial scatter patterns were randomly selected in a computer simulation and subsequently classified automatically using a SVM algorithm. The classification accuracy was estimated using 5×2 cross-validation (Table 4). A similar procedure was performed using a mixture of *Salmonella* species to show classification on the species level (Table 5). Finally, the applicability of the system to automated classification at the strain level was established with *E. coli* cultures (*E. coli* K12 (non pathogen), *E. coli* H7G458, *E. coli* H7G5295, *E. coli* H701, *E. coli* O25:K19:VM (ETEC), and *E. coli* O78:H11 (ETEC)). The classification results are shown in Table 6 below.

TABLE 4

Sensitivity and specificity of the recognition classification algorithm for mixture of various species representing five bacterial genera. The estimation of classification success was produced using 5 × 2 cross-validation.

| Bacteria | Sensitivity | 1-Precision | F-score |
|---|---|---|---|
| *E. coli* | 0.9046 | 0.0547 | 0.924 |
| *Listeria* | 0.9494 | 0.0563 | 0.946 |
| *Staphylococcus* | 0.9935 | 0.0148 | 0.989 |
| *Salmonella* | 0.9564 | 0.0674 | 0.944 |
| *Vibrio* | 0.9452 | 0.0522 | 0.946 |

TABLE 5

Sensitivity and specificity of the recognition classification algorithm for various species of *Salmonella* estimated using 5 × 2 cross-validation.

| *Salmonella* spp. | Sensitivity | 1-Precision | F-score |
|---|---|---|---|
| *S. copenhagen* | 0.8105 | 0.0855 | 0.86 |
| *S. enteriditis* 13096 | 0.8809 | 0.0689 | 0.90 |
| *S. enteriditis* PT28 | 1 | 0.0281 | 0.98 |
| *S. enteriditis* PT4 | 0.9404 | 0.1549 | 0.89 |
| *S. tennessee* | 0.859 | 0.1667 | 0.84 |

TABLE 6

Sensitivity and specificity of the recognition classification algorithm for various strains of *E. coli* estimated using 5 × 2 cross-validation.

| *E. coli* | Sensitivity | 1-Precision | F-score |
|---|---|---|---|
| *E. coli* H701 | 0.8187 | 0.2406 | 0.7879 |
| *E. coli* ETEC025 | 0.8 | 0.1599 | 0.8196 |
| *E. coli* ETEC078 | 0.7657 | 0.282 | 0.7411 |
| *E. coli* K12 | 0.9231 | 0.0536 | 0.9346 |
| *E. coli* H7G458 | 0.8134 | 0.1848 | 0.8143 |
| *E. coli* H7G5295 | 0.8324 | 0.1184 | 0.8563 |

Thus, the morphology of colonies as expressed in a scattergram appears to be dependent on the genetic make up of colony-forming organisms. The morphology may also depend on other factors such the available nutrients and the growth protocol. Preliminary biochemical studies (not described herein) suggest that there may be a significant variation in the total extracellular polysaccharides produced by different bacteria. Higher production of polysaccharides by pathogenic bacteria than by their non-pathogenic counterparts has been observed. Exopolysaccharides (EPS) produced by these bacteria may contribute towards increased pathogenicity and defense against the immune system of hosts. Structurally, the increased EPS production may fill the intercellular space within the colony, resulting in changes in structural integrity, and consequently affecting the scatter pattern formed when colonies are illuminated with laser light, leading to the varied scattergram patterns.

The combination of hardware and software to accomplish the tasks described herein is termed a system. Where otherwise not specifically defined, acronyms are given their ordinary meaning in the art.

The instructions for implementing processes or methods of the system may be provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media, or distributed thereon. The functions, acts or tasks are independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing, grid processing, and the like.

In an embodiment, the instructions may be stored on a removable media device for reading by local or remote systems. In other embodiments, the instructions may be stored in a remote location for transfer through a computer network, a local or wide area network, or over telephone lines. In yet other embodiments, the instructions are stored within a given computer or system.

The instructions may be a computer program product, stored or distributed on computer readable media, containing some or all of the instructions to be executed on a computer to perform all or a portion of the method or the operation of the system.

Herein a computer is meant to include, as needed, the central processor unit (CPU), appropriate storage media for data and software, network interfaces, including wireless, Internet and LAN, input and output data terminals, displays, and the like, as is known in the art.

Where the term "data network", "web" or "Internet" is used, the intent is to describe an internetworking environment, including both local and wide area networks, where defined transmission protocols are used to facilitate communications between diverse, possibly geographically dispersed, entities, including cluster computers on a campus, or a wide area network, or the like. An example of such an environment is the world-wide-web (WWW) and the use of the TCP/IP data packet protocol, and the use of Ethernet or other known or later developed hardware and software protocols for some of the data paths.

Communications between the devices, systems and applications, and an interface to a data network, may be by the use of either wired or wireless connections. Wireless communication may include, audio, radio, lightwave or other technique not requiring a physical connection between a transmitting device and a corresponding receiving device. While the communication may be described as being from a transmitter to a receiver, this does not exclude the reverse path, and a wireless communications device may include both transmitting and receiving functions.

Where the term "wireless" is used, it should be understood to encompass a transmitting and receiving apparatus, a transceiving apparatus, or the like, including any antennas, and electronic circuits for modulating or demodulating information onto an electrical signal, which may subsequently be radiated or received. The term wireless, when describing an apparatus, does not encompass an electromagnetic signal in its free-space manifestation. A wireless apparatus may include both ends of a communications circuit or only a first end of a circuit where another end of the circuit is a wireless apparatus interoperable with the wireless apparatus at the first end of the circuit.

A method of identifying genotypes of samples based on analysis of colony phenotypes is described. The method includes the steps of: obtaining scattergrams of organism colonies for organisms of a genotype grown according to a protocol; extracting colony scattergram features from the scattergrams of a specific genotype using a learning technique; and using the learned features to classify scattergrams obtained from colonies having an unknown genotype.

The steps in the method may be performed in separate procedures. That is, in a laboratory or research environment, for example, known genotypes may be cultured according to a protocol so as to form colonies, and a substantial number of colonies of each genotype used to obtain scattergrams. The scattergrams may be recorded and subject to feature extraction an analysis using, for example Zernike moments, Chebyshev moments or Haralick texture features, or a combination of the techniques.

Using a machine learning technique, which may be a support vector machine (SVM) classifier, decision tree, maximum likelihood classifier, neural networks, or the like, appropriate decision criteria may be developed with respect to the observed features. These features may be embodied in a classification algorithm. The learning process may be either supervised or unsupervised.

Once the learning process has been performed and validated, the classification algorithm may separately be used to identify specimen colonies of unknown samples, where the organism samples are cultured according the essentially the same protocol as the known organisms, and scattergram images obtained by the same type, or equivalent, imaging apparatus.

Features may be extracted from the images of the scattergrams of the unknown samples, as previously described, and analyzed by the classification algorithm to determine if the unknown sample phenotype is identifiable as likely being a known sample phenotype. By this method the phenotypes of known genotypes are used to associate a phenotype from a sample with a known genotype.

Of course, an unknown organism having an unknown phenotype may also be used for training, and samples of the unknown organism obtained elsewhere may be identified by the method. A system trained on an unknown organism may be used either to identify the unknown organism when it occurs in a sample, or to exclude the unknown organism. In an aspect, a plurality of unknown organisms may be used to train the system and subsequent samples may be categorized so as to select an organism from the plurality of unknown organisms. Some of the phenotypes may also be associated with known genotypes. In this manner, samples of, for example, soil, may be scanned so as to identify only those organisms of a single species, or only organisms of an unknown species of a group of unknown species.

In an aspect, where a material sample, such as a soil sample, may have a plurality of organisms, the system and method may, for example, use the phenotype of a colony to exclude additional examples of a colony having the same phenotype. This may facilitate the screening of a sample for new genotypes, where a colony of the now excluded phenotype has already been selected for analysis from the present sample or another sample. Phenotypes corresponding to known genotypes may also be excluded. Where a plurality of such phenotypes have already been selected or are known, and now excluded, a sample may be surveyed to determine whether an unknown phenotype is present.

When obtaining the scattergrams, the operation of the apparatus may be manual, semiautomatic, or automatic. That is, steps of obtaining a sample, culturing the sample so as to yield colonies, inserting the sample carrier in the apparatus for obtaining scattergrams, positioning the colony with respect to the laser beam, and obtaining an image of the scattergram may be manual, semiautomatic, or automatic, or a combination of the types. The extraction of features and the classification of the sample is computationally intensive and most of the steps are performed by a computing system after the image is obtained.

Figure 7:
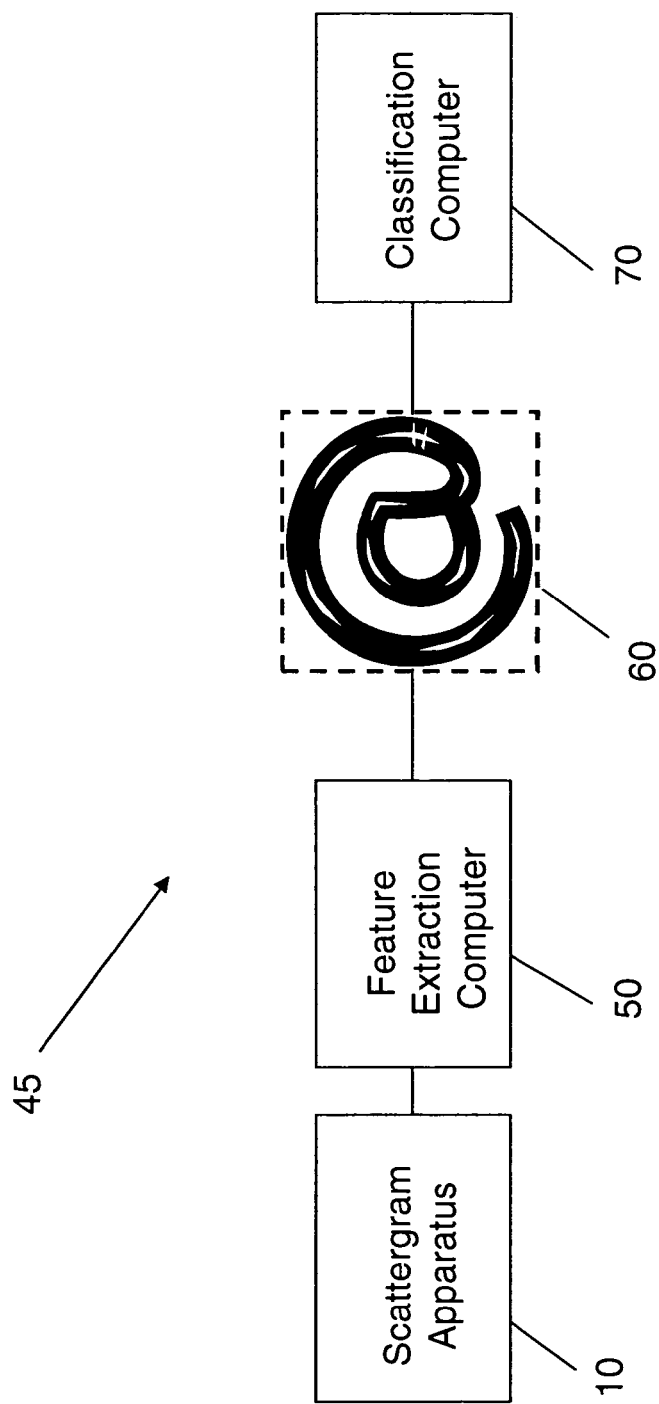
FIG. 7 is a block diagram of a system for identifying organisms having a remote apparatus connected to a classification computer over a communications network.

A remotely locatable apparatus 45 for sampling the environment may automatically obtain a sample of, for example, air or water, culture the sample, and obtain scattergram images. Subsequently, either locally or by the transmission of the image or feature vector over a communications network such as the Internet, by wireless devices, or the like, provide the data to a data processing computer executing software stored in a memory to perform the classification of the sample genotype. The classification of the genotype may be compared with a data base of known genotypes to determine if the genotype is of interest: for example, a pathogen. In a system as shown in FIG. 7, a scattergram device 10 such as shown in FIG. 2 may be connected to a computer 50, so that the image data recorded by the camera, or by an equivalent detection device, such as a CCD may be processed for feature extraction. The features may be extracted using the moments and GLCM methods described herein, or similar techniques. Such feature extraction may be used to reduce the amount of image data that is transmitted to another site for data analysis, although entire images may be transmitted, providing that sufficient bandwidth is provided in the communications system. In an alternative, all of the analysis and classification may be performed in the computer 50, and only the classification result displayed or transmitted.

The sample may have more than one colony, and colonies suitable for scattergram analysis may be selected by imaging means. The resultant feature vectors may be selected according to search criteria and specific feature sets, or the results of the classification of the feature sets transmitted to another site.

The remote site 45 may transmit data to another site, which may have a classification computer 70, over a communications network 60, which may be the Internet. The remote site may be connectable to the internet by a wired or wireless connection, and some of the connection apparatus may be a part of the system, although the inclusion of the connection aspects in the remote apparatus 45 may be a matter of design choice.

The classification computer 70 may also perform the functions of feature extraction using the same or different techniques from that used in the remote site computer 50. The extent of the analysis to be performed by the computer 50 and the computer 70 is a matter of design choice.

Figure 8:
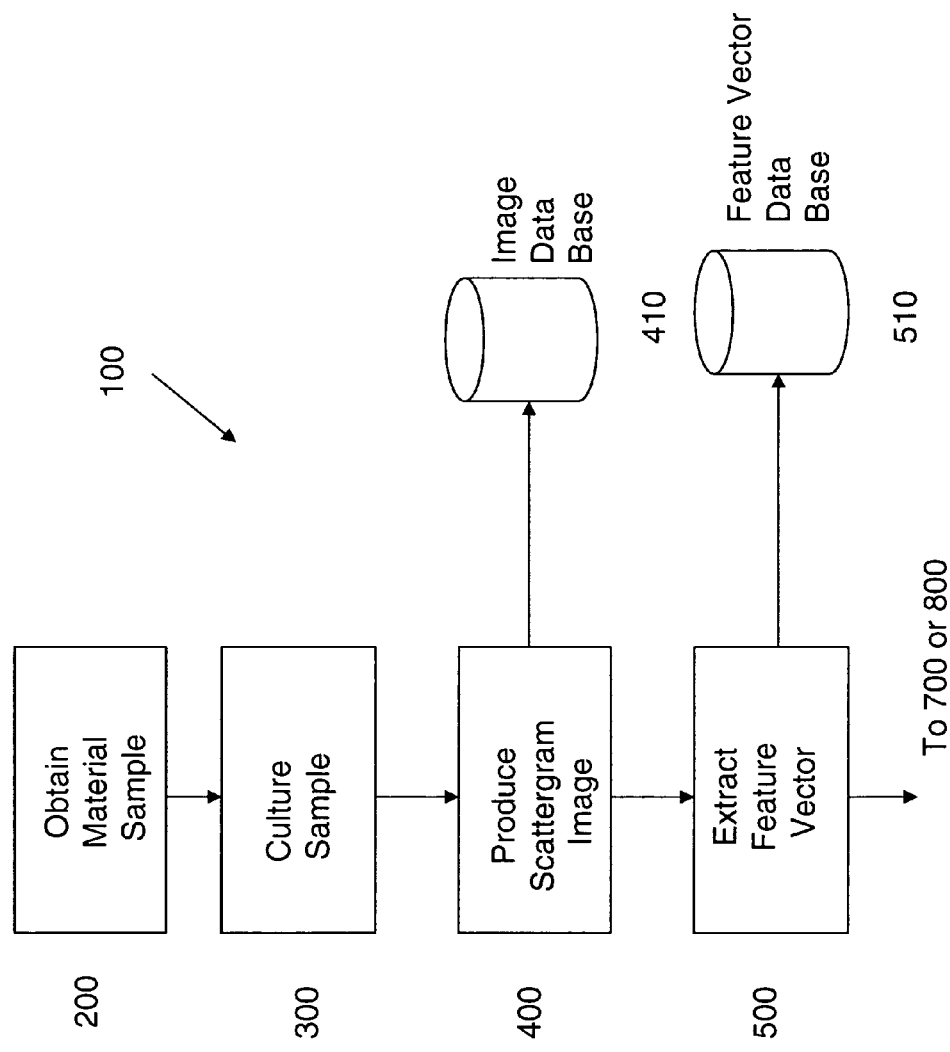
FIG. 8 is a flow chart for a method of collecting scattergram images and extracting feature vectors.

In another aspect, as shown in FIG. 8, a method of identification and classification 100 may include the steps of obtaining a sample of material to be analyzed 200, and culturing the sample so as to form colonies 300. The cultured sample is introduced in to an apparatus for producing scattergrams, and a scattergram image of a colony is produced 400. The images may be stored in an image data base. The images are analyzed so as to extract a feature vector for each analyzed image 500, and the feature vectors may be stored in a feature vector data base, indexed so as to correlate with the images.

The extracted feature vectors may be used either a) to train the system in identifying colonies, or b) to use the trained system to identify colonies.

Figure 9:
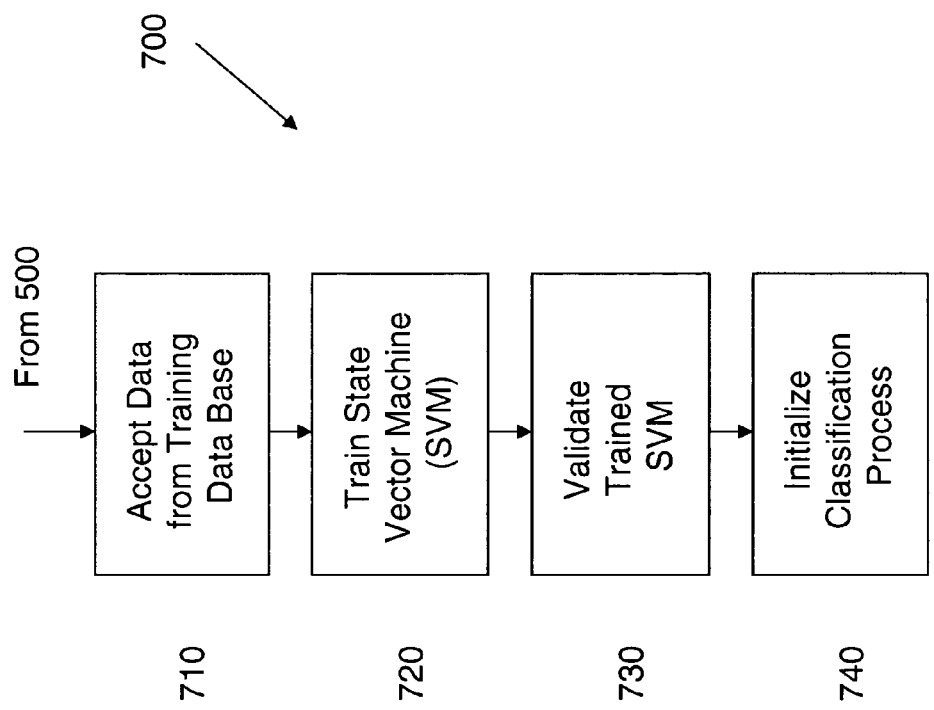
FIG. 9 is a flow chart for a method of training a characterization process.

FIG. 9 shows the steps in training a system. Data that has been accumulated in the feature vector data base 510 for a known species or strain of organism (or for an unidentified but characterizable organism) is accepted by the training software 710 operable on a computer system, and the system is trained 720 using, for example, a SVM. After training, the SVM is validated in step 730, using, for example, the methods previously described, and the validated training data used to initialize the SVM to perform a classification function 740.

Figure 10:
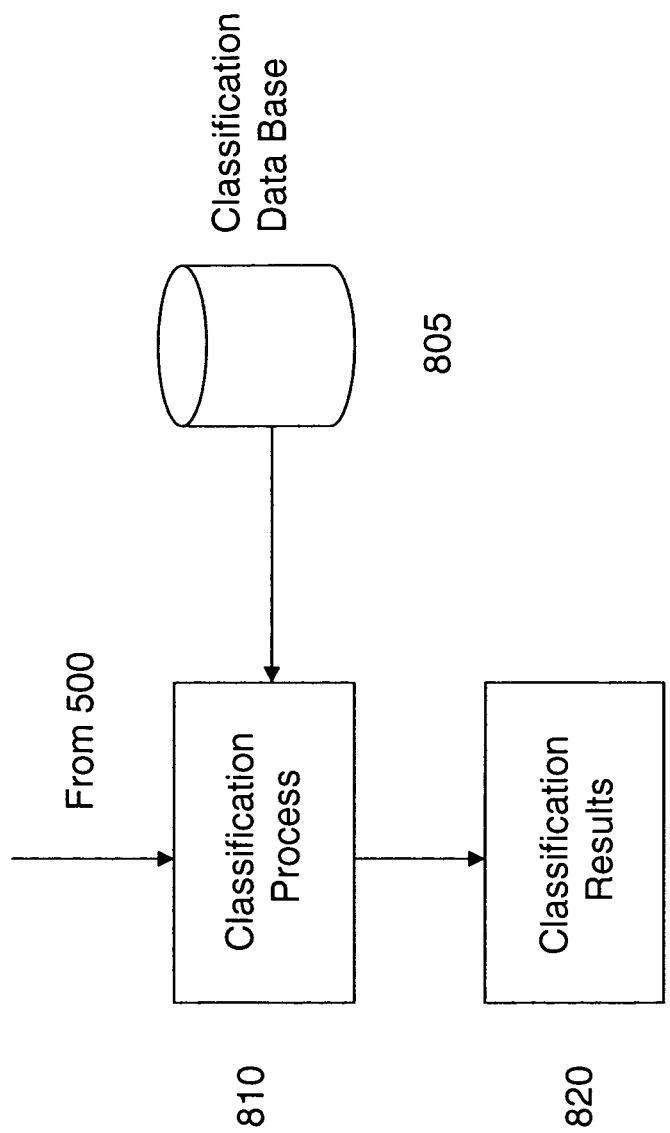
FIG. 10 is a flow chart for a method of using a trained characterization process to identify an organism.

The results of the feature vector extraction step 500 may be processed in a classification process 800, using the trained classification algorithm. FIG. 10, shows the process where the classification process 810 is, for example a SVM initialized using a classification data base 805, which may be data obtained from the training process 700 for one or more organisms. The classification process 810 produces a classification result 820, which may be displayed, stored, or transmitted to a user over a communications network.

Figure 11:
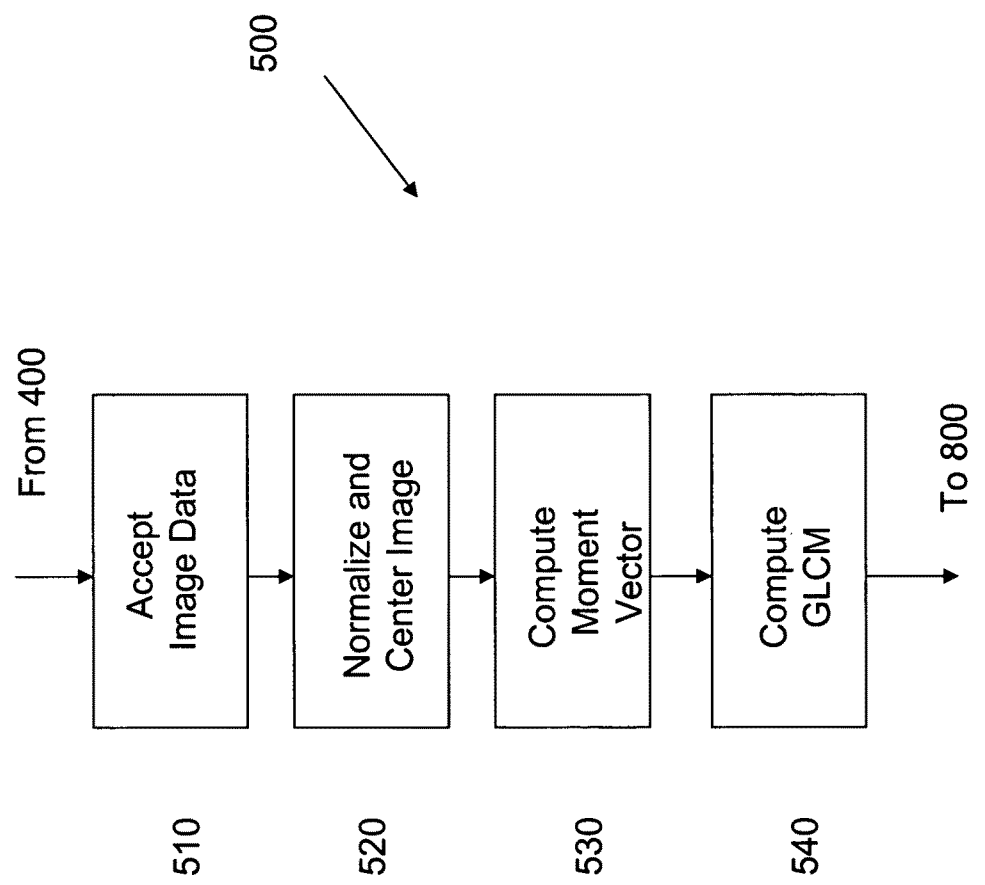
FIG. 11 is a flow chart of the a method of extraction of a feature vector in the method of FIG. 8; and, FIG. 12 is a flow chart of a method of preparing the image data from processing in the method of FIG. 11.

In an aspect, as shown in FIG. 11, the step of extracting a feature vector 500 may include accepting digital image data 510, normalizing the gray scale range of the data and centering the image in the analysis window 520. The feature vector may be extracted by using orthogonal moments such as Zernike or Chebychev functions in step 530, and other characterizing data such as a GLCM may be used 540, and the combination of steps 530 and 540 used as a feature vector.

Figure 12:
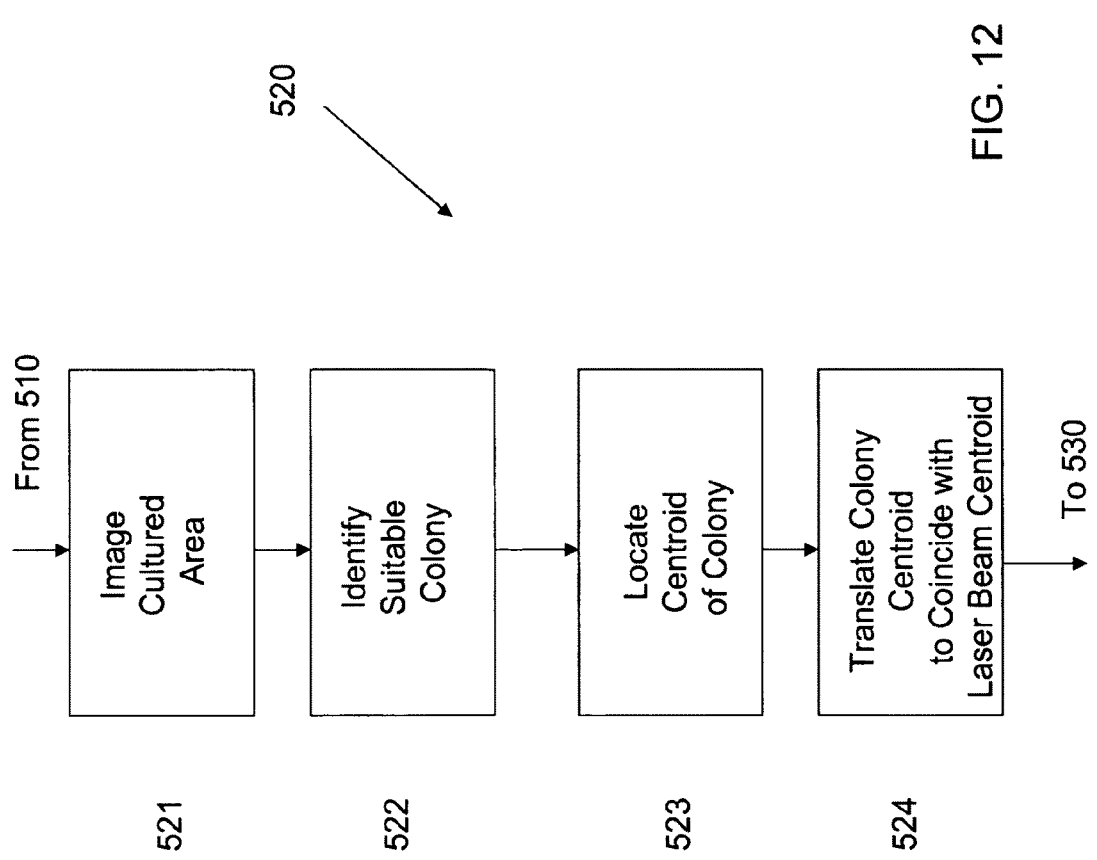

In another aspect, shown in FIG. 12, the step of normalizing and centering the image 520 may further include the stems of imaging the cultured area 521 so as to identify colonies suitable to produce scattergram data 522. Such colonies may be identified on the basis of size and optical properties in either transmission or reflection. The coordinates of the centroid of each suitable colony are measured 523 such that selected colonies may be translated by the apparatus such that the centroid of the selected colony is disposed so as to coincide with the centroid of the illuminating beam in step 524.

While the methods disclosed herein have been described and shown with reference to particular steps performed in a particular order, it will be understood that these steps may be combined, sub-divided, or reordered to from an equivalent method without departing from the teachings of the present invention. Accordingly, unless specifically indicated herein, the order and grouping of steps is not a limitation of the present invention.

It is therefore intended that the foregoing detailed description be regarded as illustrative rather than limiting, and that it be understood that it is the following claims, including all equivalents, that are intended to define the spirit and scope of this invention.

The invention claimed is:

1. A system for the identification of microorganisms comprising:
   a coherent light source;
   a holder adapted to receive a substrate having a surface adapted for growth of microorganisms,
   a scanner adapted to scan a region of the substrate to identify a centroid position of a colony of microorganisms;
   an image capture device disposed to receive forward scattered light from the colony; and
   a first computer configured to extract a feature vector from the image,
   wherein an orientation of the coherent light source and the colony is configured to be adjusted so that a centroid of a coherent light beam substantially coincides with the centroid of the position of the colony.

2. The system of claim 1, wherein a second computer is configured to compare the feature vector with an identification data set so as to determine whether the feature vector is identifiable with a specific organism contained in the identification data set.

3. The system of claim 2, wherein the identified organism type is displayed.

4. The system of claim 2, wherein the organism type is classified as one of pathogenic or non-pathogenic.

5. The system of claim 2, wherein the feature vector is associated with a phenotypic characteristic of the colony and the identification data set associates the phenotype with a genotype.

6. The system of claim 2, wherein the first computer and the second computer are the same computer.

7. The system of claim 2, wherein the first computer and the second computer are connectable over a communications network.

8. The system of claim 7, wherein the communications network is, at least in part, a wireless circuit.

9. The system of claim 1, wherein the feature vector is a Zernike moment.

10. The system of claim 1, wherein the feature vector is a Chebyshev moment.

11. The system of claim 1, wherein the feature vector is a gray-level co-occurrence matrix (GLCM).

12. The system of claim 1 wherein the feature vector is at least two of a Zernike moment, a Chebyshev moment, or a grey-level co-occurrence matrix (GLCM).

13. A method of identifying microorganisms, the method comprising:
    culturing a sample of material on a substrate to form a colony of microorganisms;
    scanning a region of the substrate to determine a centroid position of the colony;
    adjusting a relative orientation of a coherent light beam and the colony such that a centroid of the coherent light beam substantially coincides with the centroid position of the colony;
    obtaining image data of the colony illuminated by the coherent light beam;
    analyzing the image data; and
    categorizing the analyzed image data to identify a type of the colony.

14. The method of claim 13, wherein the image data is recorded on a photographic film or by an array of photosensitive electronic elements.

15. The method of claim 13, wherein the adjusting the relative orientation is performed by a two-axis positioner.

16. The method of claim 13, wherein analyzing the image data further comprises:
    extracting a feature vector from the image data.

17. The method of claim 16, wherein the extracting a feature vector further comprises:
    characterizing the image data using a function having an invariant magnitude in at least one dimension.

18. The method of claim 16, wherein the extracting a feature vector further comprises:
    characterizing the image by computing a gray-level co-occurrence matrix (GLCM).

19. The method of claim 16, wherein the extracting a feature vector further comprises:
    characterizing the image using a function having an invariant magnitude in at least one dimension and by computing a gray-level co-occurrence matrix (GLCM).

20. The method of claim 16, wherein the image data is normalized prior to the feature vector extraction.

21. The method of claim 13, wherein categorizing the analyzed image data further comprises:
    comparing a feature vector extracted from the image data with a pre-determined data set, the data set characterizing at least one known genotype.

22. The method of claim 21, wherein the data set is trained using feature vectors extracted from a plurality of colonies of the known genotype.

23. The method of claim 22, wherein the training is supervised.

24. The method of claim 22, wherein the training is unsupervised.

25. The method of claim 22, wherein the training and categorization is performed by a support vector machine (SVM).

26. The method of claim 13, wherein the categorization is performed by a process that has been trained by feature vectors from a plurality of colonies having a known genotype.

27. The method of claim 26, wherein the training is performed on a separate computer from a computer used for categorization.

28. A computer program product stored or distributed on a non-transient computer readable medium, including instructions causing a computer to:

control a scanner to scan a region of the substrate to determine a centroid position of a colony of microorganisms cultured thereon;
adjust a relative orientation of a coherent light beam and the colony such that a centroid of a coherent light beam substantially coincides with the centroid position of the colony
acquire image data of the colony from an imaging device;
characterize the image data to produce a feature vector of the image data; and
categorize the image data using the feature vector and process that has been trained by using feature vectors previously obtained from colonies of a known genotype.

29. A computer program product stored or distributed on a non-transient computer readable medium, including instructions causing a computer to:
control a scanner to scan a region of the substrate to determine a centroid position of a colony of microorganisms cultured thereon;
adjust a relative orientation of a coherent light beam and the colony such that a centroid of a coherent light beam substantially coincides with the centroid position of the colony;
acquire image data of the colony from an imaging device;
characterize the image data to produce feature vectors of the image data; and
train a characterization process using by using feature vectors obtained from colonies of a known genotype.

30. A method of screening material samples, the method comprising:
culturing a material sample on a substrate;
scanning the substrate to determine a centroid position of a colony of the cultured material sample;
adjusting a position of a centroid of a coherent light beam so that a centroid of the coherent light beam is substantially coincident with the centroid position of the colony;
obtaining image data for the colony;
extracting a feature vector from the image data; and
categorizing the colony based on the feature vector.

31. The computer program product of claim 30, wherein the characterization process is a support vector machine (SVM).

32. The method of claim 30, wherein the step of categorizing comprises:
comparing the feature vector of the image data against a data base of feature vectors;
determining whether the feature vector is characteristic of at least one of feature vectors of the data base of feature vectors.

33. The method of claim 32, wherein an indication that the colony does not match any of the feature vectors of the data base is provided.

34. The method of claim 33, wherein the indication is provided on a computer display.

35. The method of claim 34, where the feature vector of a selected colony is added to the data base of feature vectors.

36. The method of claim 32, wherein the data base of feature vectors comprises feature vectors associated with known genotypes.

37. The method of claim 36, wherein the data base of feature vectors further comprises feature vectors associated with unknown genotypes.

38. The method of claim 37, where the feature vectors associated with unknown genotypes are associated with colonies previously selected for analysis.

39. The method of claim 30, wherein the characterizing is performed by a support vector machine (SVM) and the SVM is trained using a feature vector data base, the feature vector data base including feature vectors obtained during a previous sample screening.

40. The method of claim 1, wherein the image capture device is a camera.

41. The method of claim 1, wherein the image capture device is an electronic device.

42. The method of claim 41, wherein the electronic device is a two-dimensional charge coupled device (CCD).

* * * * *